US010747755B2

(12) United States Patent
Bae

(10) Patent No.: US 10,747,755 B2
(45) Date of Patent: Aug. 18, 2020

(54) METHOD FOR PROVIDING IMMEDIATE RESULT FOR USER INPUT, AND APPARATUS THEREFOR

(71) Applicant: SK PLANET CO., LTD., Seongnam-si, Gyeonggi-do (KR)

(72) Inventor: Taemeon Bae, Seoul (KR)

(73) Assignee: SK PLANET CO., LTD., Seongnam-Si, Gyeonggi-Do (KR)

( * ) Notice: Subject to any disclaimer, the term of this patent is extended or adjusted under 35 U.S.C. 154(b) by 1098 days.

(21) Appl. No.: 14/568,785

(22) Filed: Dec. 12, 2014

(65) Prior Publication Data

US 2015/0169673 A1 Jun. 18, 2015

Related U.S. Application Data

(63) Continuation of application No. PCT/KR2013/007658, filed on Aug. 27, 2013.

(30) Foreign Application Priority Data

Dec. 12, 2012 (KR) .................. 10-2012-0144191
Dec. 12, 2012 (KR) .................. 10-2012-0144192

(51) Int. Cl.
*G06F 16/24* (2019.01)
*H04L 29/08* (2006.01)
*H04L 29/06* (2006.01)

(52) U.S. Cl.
CPC .............. *G06F 16/24* (2019.01); *H04L 67/10* (2013.01); *H04L 67/2842* (2013.01); *H04L 67/42* (2013.01); *H04L 67/38* (2013.01)

(58) Field of Classification Search
CPC ......... G06F 17/30368; G06F 17/30867; G06F 17/2785; G06F 17/30525; G06F 17/3053; G06F 17/30256; G06F 17/30265
See application file for complete search history.

(56) References Cited

U.S. PATENT DOCUMENTS 5,758,087 A * 5/1998 Aaker .................. H04L 67/42
370/389
6,415,317 B1 * 7/2002 Yelon .................. A63F 13/12
709/205

(Continued)

FOREIGN PATENT DOCUMENTS

CN 101833562 A 9/2010
KR 1020050005751 A 1/2005

(Continued)

OTHER PUBLICATIONS

International Search Report for PCT/KR2013/007658 dated Nov. 29, 2013.

(Continued)

*Primary Examiner* — Neveen Abel Jalil
*Assistant Examiner* — Irene Baker
(74) *Attorney, Agent, or Firm* — Fenwick & West LLP

(57) ABSTRACT

The present invention relates to a method for providing a processed result following a user input, and more specifically to a method for providing a service allowing a more rapid and immediate result to be provided to a user input by outputting, when a particular input is entered by a user, a predictive response information, previously stored in the client terminal, before the particular input is transmitted to a service apparatus, and a system and an apparatus therefor.

6 Claims, 8 Drawing Sheets

(56) References Cited

U.S. PATENT DOCUMENTS

| | | | |
|---|---|---|---|
| 6,538,667 B1 | 3/2003 | Duursma et al. | |
| 8,069,258 B1* | 11/2011 | Howell | H04L 67/38 |
| | | | 463/42 |
| 8,671,435 B2* | 3/2014 | Bae | H04M 1/72522 |
| | | | 709/219 |
| 8,678,929 B1* | 3/2014 | Nishimura | A63F 13/10 |
| | | | 463/31 |
| 9,223,902 B1* | 12/2015 | McHugh | G06F 17/30967 |
| 9,355,461 B2* | 5/2016 | Bae | H04N 21/6405 |
| 9,852,135 B1* | 12/2017 | McHugh | G06F 17/30017 |
| 2007/0088681 A1 | 4/2007 | Aravamudan et al. | |
| 2010/0174735 A1 | 7/2010 | Fiatal | |
| 2012/0167083 A1* | 6/2012 | Suit | G06F 11/0712 |
| | | | 718/1 |
| 2012/0221477 A1* | 8/2012 | Pande | G06Q 10/10 |
| | | | 705/321 |
| 2013/0086273 A1* | 4/2013 | Wray | G06F 9/5072 |
| | | | 709/226 |
| 2013/0123004 A1* | 5/2013 | Kruglick | A63F 13/50 |
| | | | 463/29 |
| 2013/0159220 A1* | 6/2013 | Winn | G06Q 10/10 |
| | | | 706/12 |
| 2013/0332510 A1* | 12/2013 | Pritchett | H04L 67/10 |
| | | | 709/203 |
| 2014/0143296 A1* | 5/2014 | Odorovic | G06F 3/038 |
| | | | 709/203 |
| 2014/0259038 A1* | 9/2014 | Belyaev | H04N 21/458 |
| | | | 725/14 |
| 2015/0100629 A1* | 4/2015 | Bae | H04L 67/10 |
| | | | 709/203 |
| 2015/0366518 A1* | 12/2015 | Sampson | A61B 5/7221 |
| | | | 600/301 |
| 2017/0366838 A1* | 12/2017 | Chu | G06T 15/20 |

FOREIGN PATENT DOCUMENTS

| | | |
|---|---|---|
| KR | 100798963 B1 | 1/2008 |
| KR | 1020090087938 A | 8/2009 |
| KR | 1020110094765 A | 8/2011 |

OTHER PUBLICATIONS

Extended European Search Report dated Jun. 22, 2016 in connection with the counterpart European Patent Application No. 13862982.9-1870.

Office Action dated Jan. 24, 2017 from Chinese Patent Office in connection with the counterpart Chinese patent application No. 201380062961.9.

* cited by examiner

METHOD FOR PROVIDING IMMEDIATE RESULT FOR USER INPUT, AND APPARATUS THEREFOR

CROSS-REFERENCE TO RELATED APPLICATION

This application claims priority to and the benefit of Korean Patent Application No. 10-2012-0144191 and 10-2012-0144192 filed in the Korean Intellectual Property Office on Dec. 12, 2012 respectively, the entire contents of which are incorporated herein by reference.

TECHNICAL FIELD

The present invention relates to a method for providing a processing result based on a user input, and more particularly, to a service providing method, and a system and apparatus therefore that may rapidly provide an immediate result for a user input by first outputting predictive response information that is previously stored in a client terminal before transmitting a specific input to a service device when the specific input is input by a user.

BACKGROUND

As technologies are being developed, the number of applications that can run on user terminals has increased, and specifications of the terminals required to run the applications also has been dramatically developed.

However, inconveniently, in order to run a high-end application such as a 3-dimensional (3D) game, users should check in advance whether their terminals are appropriate to run the high-end application. If the terminals do not have a specification sufficient to run a high-end application, users cannot use the application itself.

Accordingly, a cloud service, in which users can access a service provided by a service provider through a network and use an application, regardless of a specification of the user's terminal, has received much attention.

Recently, a screen virtualization-based cloud service has been developed. The screen virtualization-based cloud service denotes a service that transmits a result screen of an application executed on a server to a terminal of a user upon the user's request to enable the user to easily use the application despite not having the application provided in his/her terminal.

In the screen virtualization-based cloud service, above all, a technology for providing an immediate output result based on a user input needs to be developed.

SUMMARY

The present invention is directed to providing a service providing method, and a system and apparatus therefore that may provide an immediate result for a user input, which may rapidly provide a processing result for a user input by first outputting predictive response information that is previously stored in a client terminal before transmitting a specific input to a service device when the specific input is input by a user.

The present invention is also directed to providing a service providing method, and a system and apparatus therefore that may provide an immediate result for a user input, which may accurately provide a processing result for a user input to a client terminal by establishing statistics of input response for each client terminal and generating predictive response information based on the statistics.

One aspect of the present invention provides a system for providing an immediate result for a user input, the system including: a client terminal configured to output a previously stored predictive response information corresponding to input information input from a user, transmit the input information and the predictive response information to a service device, and when predictive response information is received from the service device, output the predictive response information received from the service device in replacement of the previously output predictive response information, and when actual response information is received from the service device, output the actual response information in replacement of the predictive response information; and a service device configured to execute a specific application according to a request of any one client terminal, transmit result information obtained by executing the application to the client terminal in real time, and when the input information and the predictive information are received from the client terminal, compare the predictive response information received from the client terminal with previously stored predictive response information corresponding to the input information, and when the predictive response information is different, transmit the previously stored predictive response information to the client terminal, generate actual response information for the input information, compare the actual response information with the predictive response information previously transmitted to the client terminal, and when the actual response information and the predictive response information are different, transmit the actual response information to the client terminal.

Another aspect of the present invention provides a service device including: a device storage unit configured to store predictive response information for one or more pieces of input information; and a device control unit configured to perform control to execute a specific application according to a request of any one client terminal, transmit result information obtained by executing the application to the client terminal in real time, and when input information and predictive information are received from the client terminal, compare the predictive response information received from the client terminal with predictive response information previously stored in the device storage unit corresponding to the input information, and when the predictive response information is different, transmit the previously stored predictive response information to the client terminal, generate actual response information for the input information, compare the actual response information with the predictive response information previously transmitted to the client terminal, and when the actual response information and the predictive response information are different, transmit the actual response information to the client terminal.

The device storage unit may further include basic predictive response information calculated according to a pattern of the received input information and user information-based predictive response information calculated according to a pattern of input information received from a specific client terminal.

When the input information and the predictive response information are received from the client terminal, the device control unit may check whether user information-based predictive response information generated corresponding to the client terminal exists, and when the user information-based predictive response information exists, compare the user information-based predictive response information with the predictive response information received from the client terminal, and when the user information-based predictive response information and the predictive response information are different, transmit the user information-based predictive response information to the client terminal.

When the user information-based predictive response information generated corresponding to the client terminal does not exist in the device storage unit, the device control unit may compare the basic predictive response information corresponding to the input information with the predictive response information received from the client terminal, and when the basic predictive response information and the received predictive response information are different, transmit the basic predictive response information to the client terminal.

When the predictive response information corresponding to the input information does not exist in the device storage unit, the device control unit may perform control to compare the actual response information for the input information with the predictive response information received from the client terminal and when the actual response information and the predictive response information are different, transmit the actual response information to the client terminal.

Still another aspect of the present invention provides a system for providing an immediate result for a user input, the system including: a client terminal configured to transmit input information input from a user, and when predictive response information is received from the service device, output the predictive response information, and when actual response information is received from the service device, output the actual response information in replacement of the predictive response information; and a service device configured to execute a specific application according to a request of any one client terminal, transmit result information obtained by executing the application to the client terminal in real time, and when the input information is received from the client terminal, transmit a previously stored predictive response information to the client terminal corresponding to the input information, generate actual response information for the input information, compare the predictive response information with the actual response information, and when the predictive response information and the actual response information are different, transmit the actual response information to the client terminal.

Still another aspect of the present invention provides a service device including: a device storage unit configured to store predictive response information for one or more pieces of input information; and a device control unit configured to execute a specific application according to a request of any one client terminal, transmit result information obtained by executing the application to the client terminal in real time, and when input information is received from the client terminal while transmitting result information obtained by executing the application to the client terminal in real time, transmit predictive response information for the input information that is previously stored in the device storage unit, generate actual response information for the input information, compare the predictive response information with the actual response information, and when the predictive response information and the actual response information are different, transmit the actual response information to the client terminal.

The device storage unit may further include basic predictive response information calculated according to a pattern of the received input information and user information-based predictive response information calculated according to a pattern of input information received from a specific client terminal.

When the input information is received from the client terminal, the device control unit may check whether user information-based predictive response information generated corresponding to the client terminal exists, and when the user information-based predictive response information exists, transmit the user information-based predictive response information to the client terminal.

When the user information-based predictive response information generated corresponding to the client terminal does not exist, the device control unit may transmit the basic predictive response information corresponding to the input information to the client terminal.

When the predictive response information corresponding to the input information does not exist in the device storage unit, the device control unit may transmit actual response information for the input information to the client terminal.

The device control unit may determine whether the input information received from the client terminal is input information requiring an immediate result, and only when the input information is input information requiring an immediate result, transmit the predictive response information for the input information to the client terminal.

The device control unit may encode screen data obtained by executing the application in real time to transmit the encoded screen data to the client terminal. Still another aspect of the present invention provides a method of providing a service, the method including: receiving input information and predictive response information from any one client terminal; comparing the predictive response information received from the client terminal with previously stored predictive response information corresponding to the input information; and when the predictive response information is different, as a result of the comparison, transmitting the previously stored predictive response information to the client terminal.

The method may further comprising, before the receiving: executing a specific application according to a request of the client terminal; and transmitting result information obtained by executing the application to the client terminal in real time.

The comparing includes: checking whether user information-based predictive response information generated corresponding to the client terminal exists; and when it is checked that the user information-based predictive response information generated corresponding to the client terminal exists, comparing the previously stored user information-based predictive response information with the predictive response information received from the client terminal, and the transmitting includes, when the previously stored user information-based predictive response information and the received predictive response information are different, transmitting the previously stored user information-predictive response information to the client terminal.

The method may further include, after the transmitting, generating actual response information that is a processing result for the input information; and comparing the actual response information with the predictive response information to transmit the actual response information to the client terminal when the comparing the actual response information and the predictive response information are different.

Still another aspect of the present invention provides a method of providing a service, the method including: receiving input information from any one client terminal; transmitting previously stored response information to the client terminal corresponding to the input information; generating actual response information that is a processing result for the input information; and comparing the actual response information with the predictive response information to transmit the actual response information to the client terminal when the actual response information and the predictive response information are different.

The method may further comprising, before the receiving of input information: executing a specific application according to a request of the client terminal; and transmitting result information obtained by executing the application to the client terminal in real time.

The transmitting of the predictive response information to the client terminal may further include: searching for previously stored predictive response information for the input information corresponding to user information of the client terminal; and transmitting the searched predictive response information to the client terminal.

The searching for the predictive response information may further include: determining whether the output information received from the client terminal is output information requiring an immediate result; and when it is determined that the output information is output information requiring an immediate result, searching for the previously stored predictive response information for the input information corresponding to user information of the client terminal.

The transmitting of the predictive response information to the client terminal may include, when the previously stored predictive response information corresponding to the input information does not exist, transmitting actual response information that is a processing result for the input information.

The method may further include, after the transmitting of the actual response information, storing the actual response information for the response information corresponding to the user information; and generating predictive response information based on the actual response information for the response information to store the generated predictive response information.

Still yet another aspect of the present invention may provide a computer-readable recording medium storing a program for executing the service providing method.

According to a service providing method, and a system and apparatus therefore that may provide an immediate result for a user input, when a specific input is received from a user, predictive response information based on the input may be output first, thus rapidly providing a processing result for the user input.

Furthermore, advantageously, the present invention may accurately provide an immediate result for a user input to the client terminal by establishing statistics of input response for each client terminal and generating predictive response information based on the statistics.

DETAILED DESCRIPTION

Figure 1:
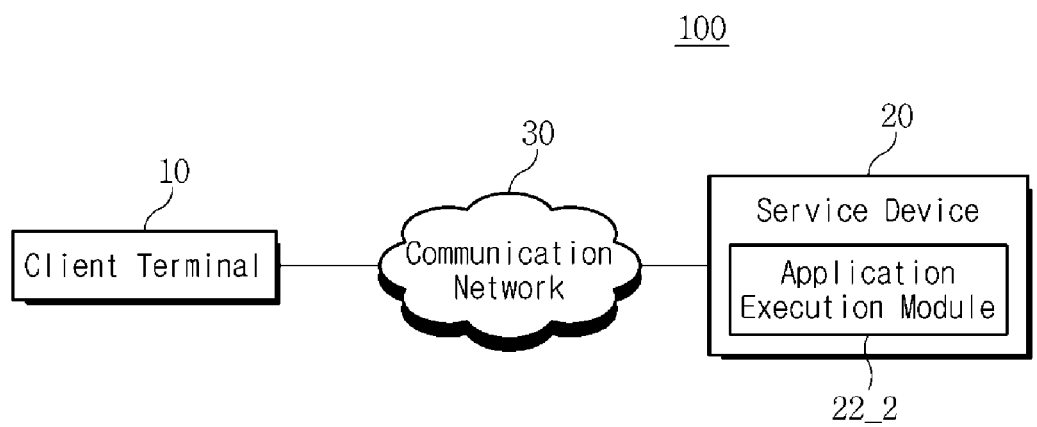
FIG. 1 is a block diagram schematically showing a system for providing an immediate result for a user input according to embodiments of the present invention.

Hereinafter, preferred embodiments of the present invention will be described in detail with reference to the accompanying drawings such that a person skilled in the art may easily carry out the embodiments of the present invention. In the following description of an operation principle according to preferred embodiments of the present invention, when the detailed description of the relevant known function or configuration is determined to unnecessarily obscure subject matters of the present invention, the detailed description will be omitted. Therefore, the unnecessary redundant description is avoided for the purpose of obviously describing the subject matters of the present invention without unnecessary obscurity. While the terms "first," "second," etc. may be used herein to describe various elements, these terms are used only to differentiate one element from another, and not to limit the elements.

In addition, like reference numerals refer to like elements throughout the specification.

A system for providing an immediate result for a user input according to embodiments of the present invention will be described below.

FIG. 1 is a block diagram schematically showing a system for providing an immediate result for a user input according to embodiments of the present invention.

Referring to FIG. 1, a system 100 for providing an immediate result for a user input of the present invention may include one or more client terminals 10, a service device 20 for executing an application according to a request from the client terminal 10 and transmitting result information obtained by executing the application to the client terminal 10, and a communication network 30.

The client terminal 10 may access the service device 20 via the communication network 30 to use various functions that are provided by the service device 20. For example, the client terminal 10 may transmit a request for executing a specific application among a plurality of applications that are provided by the service device 20 and receive result information obtained by executing the application from the service device 20 to output the result information through a screen thereof.

In particular, when input information for a specific command is input by a user while the client terminal 10 according to embodiments of the present invention receives the result information obtained by executing the application to output the result information through the screen of the client terminal 10, the client terminal 10 outputs predictive response information that is previously stored in the client terminal 10 on the screen of the client terminal 10 before transmitting the input information to the service device 20.

Here, the predictive response information denotes predictive response information generated based on previous real response information, not an actual processing result for input information.

For example, an apparatus that provides a general cloud service receives character input information of 'T' from a user, generates a processing result (font information that defines a display of 'T' and the like) for the character input information in an application being executed, and then encodes screen data for the processing result to provide the encoded screen data to the client terminal 10 of the user.

However, in this case, a time delay necessarily occurs while a user's terminal transmits the input information to the cloud service providing apparatus, receives response information in response to the input information, and outputs the received response information through its own screen.

To solve this problem, in an embodiment of the present invention, the client terminal 10 has predictive information corresponding to input information that is previously stored therein, and upon receiving the input information, for example, character input information of 'T' from the user, checks information on a position in which the character is input, and then maps and outputs a previous processing result for the character, that is, font information (a font size, a font style, and a font color) that has been already generated to display 'T' and the position information.

Subsequently, the client terminal 10 transmits the input information input from the user and the predictive response information output corresponding to the input information to the service device 20 that provides a cloud service, and upon receiving predictive response information from the service device 20, outputs the predictive response information received from the service device 20 in replacement of the output predictive response information. Since the predictive response information stored in the service device 20 may be more accurate predictive response information, when real response information obtained by actually processing the input information is received from the service device 20 after the predictive response information stored in the service device 20 is output, the client terminal 10 outputs the received real response information in replacement of the output predictive response information.

The service device 20 is a device that provides a cloud-based application to a plurality of client terminals 10. In other words, when a request for a specific application is received from any one of the client terminals 10, the service device 20 serves to execute the application and transmit only a result of the execution to the client terminal 10. More accurately, the service device 20 encodes screen data based on the application execution result frame by frame in real time, and transmits the encoded data to the client terminal 10.

To this end, the service device 20 includes a number of applications, and may include an application execution module 22_2 that may execute each application and transmit a result of the execution to the client terminal 10.

In particular, when the input information and the predictive response information are received from any one of the client terminals 10, the service device 20 of the present invention checks whether the previously stored predictive response information corresponding to the input information exists, and when the previously stored predictive response information exists, compares the previously stored predictive response information with the predictive response information received from the client terminal 10.

As a result of the comparison, if the predictive response information received from the client terminal 10 is different from the previously stored predictive response information, the service device 20 transmits the previously stored predictive response information to the client terminal 10.

Subsequently, the service device 20 processes the input information to generate real response information and then compares the real response information with the predictive response information that was previously transmitted to the client terminal 10 one more time. When the real response information is different, the service device 20 transmits the real response information to the client terminal 10.

As such, according to an embodiment of the present invention, the predictive response information previously stored in the client terminal 10 is output first corresponding to the input information that is input from the user while the cloud-based service is used. The client terminal 10 may rapidly output response information in response to the user input, and thus the user may use the cloud service without interruption.

In embodiments of the present invention, an example has been described in which the service device 20 that provides a cloud service compares the previously stored predictive response information with the predictive response information received from the client terminal 10 and transmits the predictive response information to the client terminal 10 only when the previously stored predictive response information is different and compares the transmitted predictive response information with the real response information and transmits the real response information to the client terminal 10 only when the transmitted predictive response information is different. The present invention is not limited thereto. The service device 20 may transmit the previously stored predictive response information to the client terminal 10 in response to the response information. When the previously stored predictive response information is received, the client terminal 10 may compare the output predictive response information with the predictive response information received from the service device 20. Only when the output predictive response information is different, the client terminal 10 may output the predictive response information received from service device 20 in replacement of the output predictive response information. It is the same with the real response information.

A more detailed operating method by the client terminal 10 and the service device 20 of the present invention will be described below. As described above, the client terminal 10 and the service device 20 of the present invention transmit and receive a variety of related information over the communication network 30. In this case, the communication network 30 may include various forms of communication networks.

For example, the communication network 30 may include a wireless communication type, such as wireless LAN (WLAN), Wi-Fi, Wibro, Wimax, and high speed downlink packet access (HSDPA), and a wired communication type, such as Ethernet, xDSL (ADSL, VDSL), hybrid fiber coaxial cable (HFC), fiber to the curb (FTTC), and fiber to the home (FTTH).

In addition to the above communication types, the communication network 30 may also include other communication types that are widely known or will be developed in the future.

A main configuration and an operation method of the client terminal 10 according to a first embodiment of the present invention will be described below.

Figure 2:
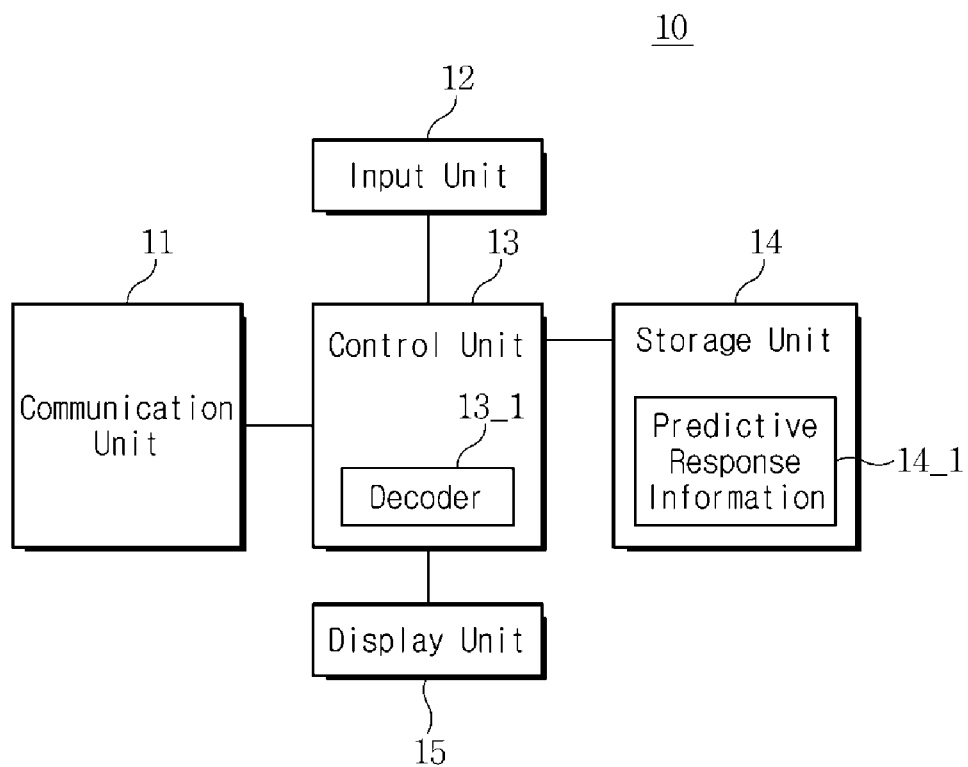
FIG. 2 is a block diagram showing a main configuration of a client terminal according to embodiments of the present invention.

FIG. 2 is a block diagram showing the main configuration of the client terminal according to embodiments of the present invention.

Referring to FIGS. 1 and 2, the client terminal 10 according to the first embodiment of the present invention may include a communication unit 11, an input unit 12, a control unit 13, a storage unit 14, and a display unit 15.

For more detailed description of each element, first, the communication unit 11 transmits and receives a variety of information associated with the service device 20 over the communication network 30. In particular, the communication unit 11 of the present invention may transmit execution request information for a specific application to the service device 20 according to the user's request and receive result information based on the application execution result from the service device 20. In this case, the communication unit 11 of the present invention may receive screen data in the form of real-time streaming according to the application execution result of the application executed in the service device 20. In addition, the communication unit 11 of the present invention may transmit input information input from the user and predictive response information corresponding to the input information to the service device 20 and receive the predictive response information and real response information from the service device 20.

The input unit 12 receives a variety of information such as number and character information from the user and delivers, to the control unit 13, a signal that is received in relation to setting of various functions and controlling of functions of the client terminal 10. In particular, the input unit 12 of the present invention serves to receive execution request information for a specific application among a plurality of applications that are provided by the service device 20 and supports an input of the user for performing various functions and operations that are generated while the application is executed.

In particular, the input information that is input through the input unit 12 while the application that is requested by the user is executed may be transmitted to the service device 20 through the communication unit 11 under control of the control unit 13.

The input unit 12 may include at least one of a keypad and a touchpad, which generates an input signal according to a touch or manipulation of a user. In this case, the input unit 12 may be configured as a touch panel (or touch screen) on the display unit 15 to be described below and perform an input function and also a display function. In addition, the input unit 12 may include one or more of a key input means such as a keyboard or keypad, a touch input means such as a touch sensor or touch pad, and a gesture input means or voice input means including one or more of a gyro sensor, a geomagnetic sensor, an acceleration sensor, a proximity sensor, and a camera. Furthermore, the input unit 12 may include all types of input means that are currently developed or will be developed in the future.

The control unit 13 performs overall control of the client terminal 10, and for example, controls a flow of signals for supplying power to and performing a function of each element constituting the client terminal 10. In this case, the control unit 13 may be a processor device that executes an operating system (OS) and drives each element, for example, a central processing unit (CPU).

In particular, the control unit according to an embodiment of the present invention supports the overall procedure that includes: requesting the service device 20 for executing a plurality of applications to execute a specific application according to the user's request, receiving a result of executing the application that is received from the service device 20 in real time, and outputting the received result. To this end, the control unit 13 of the present invention may include a stream data decoder 13_1 such as an H.264 decoder. Here, the stream data decoder 13_1 may support receiving screen data based on the application execution result provided by the service device 20 in real time, decoding the received screen data in real time, and outputting the decoded screen data through the display unit 15.

In addition, when specific input information is input from the user through the input unit 12, the control unit 13 checks whether predictive response information 14_1 corresponding to the input information is stored in the storage unit 14 to be described below. As a result of the check, when the predictive response information 14_1 is stored in the storage unit 14, the control unit 13 performs control such that the predictive response information 14_1 may be output through the display unit 15.

Subsequently, the control unit 13 transmits the input information and the predictive response information to the service device 20, and upon receiving predictive response information for the input information from the service device 20, outputs the predictive response information received from the service device 20 in replacement of the output predictive response information.

In this case, the control unit 13 may compare the predictive response information received from the service device 20 with the output predictive response information and output the predictive response information received from the service device 20 in replacement of the output predictive response information when the predictive response information is different.

Subsequently, when the real response information is received from the service device 20, the control unit 13 outputs the real response information in replacement of the predictive response information. Thus, a process of outputting the predictive response information that is previously stored in the client terminal 10 and then outputting the predictive response information received from the service device 20 in replacement of the output predictive response information and a process of outputting real response information in replacement of the predictive response information may be achieved in real time.

In addition, preferably, when the input information is input from the user, the control unit 13 may check whether the input information is input information requiring provision of an immediate result and then output the predictive response information 14_1 that is previously stored in the storage unit 14 first. This is intended to selectively output the predictive response information because there may be a case in which real response information should be provided slowly, but accurately, rather than a case in which the previously predictive response information is provided immediately in response to the input information.

For example, it is assumed that the service device 20 services a 3D role playing game application to the client terminal 10. In a situation in which several characters collect a number of items at the same time, although input information that is input by a user of the client terminal 10 is a collection command for item A, but collection of item B has progressed, the user will not feel inconvenience. Rather, the user will need an immediate processing result when a number of characters compete with each other.

However, there may be a situation in which the user desires to provide an accurate result rather than the immediate processing result. For example, if the input information of the user is a storage command for storing a current state, but a command other than the storage command is performed, the user may feel inconvenience.

As such, the control unit 13 may perform control to determine whether the input information input from the user is input information requiring an immediate output and then output the previously stored predictive response information corresponding to the input information only when the immediate output is required.

In addition, the control unit 13 of the present invention may perform control to generate predictive response information 14_1 on the basis of the real response information received from the service device 20 and store the generated predictive response information 14_1 in the storage unit 14. In this case, the control unit 13 may generate the predictive response information corresponding to the response information by type of application.

For example, if a user inputs a character 'T' having font information of Batangche and 12 points through a document editing application and receives a processing result from the service device 20 in response to the input, the control unit 13 may store the processing result corresponding to 'T' as the predictive response information.

In addition, when the user clicks [Insert] menu through the document editing application, various lower menus such as [Divide Page], [Insert Picture], [Insert Figure], and the like may be displayed. When the processing result is received from the service device 20 corresponding to the input information 'click [Insert] menu,' the control unit 13 may store the processing result, that is, information on the lower menu as the predictive response information.

In addition, when a user repeatedly inputs a word 'session' through the document editing application, the control unit 13 may perform control to generate 'session' as the predictive response information for input information 'se' corresponding to the document editing application identification information and store 'session' in the storage unit 14.

In addition, when the user inputs 'A' while using a game application A, if real response information corresponding to the 'A' is an attack behavior of a player, the control unit 13 may store 'attack in front of a player' as predictive response information for the input information 'A' corresponding to identification information for the game application A, calculate a motion vector on the basis of movement of a player in the last frame received from the service device 20, and then predict and output movement for the attack behavior.

In addition, when the real response information is received from the service device 20, the control unit 13 of the present invention may delete the previously stored predictive response information corresponding to the input information and then store the real response information as the predictive response information.

As such, when specific input information is input by the user, the client terminal 10 according to an embodiment of the present invention may output the predictive response information previously stored in the client terminal 10 corresponding to the input information before transmitting the specific input information to the service device 20, thus rapidly providing a result according to the user input.

The storage unit 14 may temporarily store an application program necessary for functional operations according to an embodiment of the present invention and various data that is generated during execution of the application program. In particular, when application-related information that is requested by the user is received from the service device 20, the storage unit 14 of the present invention may serve to temporarily store the application-related information. When execution of the application is stopped and related information is not received from the service device 20, the temporarily stored data may be deleted. In addition, the storage unit 14 according to an embodiment of the present invention may store the predictive response information and the real response information that are received from the service device 20 corresponding to input information of a user that is generated during execution of the application. Furthermore, the storage unit 14 of the present invention may store the predictive response information 14_1 that is generated corresponding to the response information under control of the control unit 13, corresponding to the application identification information.

The storage unit 14 may largely include a program area and a data area. The program area may store related information for driving the client terminal 10, such as an operating system (OS) that boots the client terminal 10, and the data area is an area for storing data generated according to the use of the client terminal 10 in which information received from the service device 20 may be temporarily stored as described above. The storage unit 14 may include a storage medium such as a flash memory, a hard disk, a multimedia card micro type memory (for example, an SD or XD memory), a random access memory (RAM), and a read only memory (ROM).

The display unit 15 displays information on a series of operation states and operation results that are generated while the client terminal 10 performs functions. In particular, the display unit 15 of the present invention may receive and display a processing result from an application provided by the service device 20 and may display the received predictive response information and real response information corresponding to input information input by the user through the input unit 12.

The display unit 15 may include a liquid crystal display (LCD), a thin film transistor LCD (TFT-LCD), an organic light emitting diode (OLED), a light emitting diode (LED), an active matrix organic LED (AMOLED), a flexible display, and a three-dimensional display.

As such, the main elements of the client terminal 10 have been described with reference to FIG. 2. However, not all of these elements shown in FIG. 2 are essential. The client terminal 10 may be implemented by more or fewer elements than those shown in the drawings.

That is, the client terminal 10 of the present invention is a device that may request the service device 20 to execute a specific application by various elements, output information received from the service device 20, and when predictive response information is stored corresponding to the input information input from the user, preferentially output the predictive response information.

The client terminal 10 of the present invention may be implemented in various forms. For example, the client terminal according to an embodiment of the present invention may be a stationary terminal such as a smart TV, a desktop computer, and the like as well as a mobile terminal such as a smart phone, a tablet PC, a personal digital assistant (PDA), a portable multimedia player (PMP), and an MP3 player.

A main configuration and an operation method of the service device 20 according to a first embodiment of the present invention will be described below.

Figure 3:
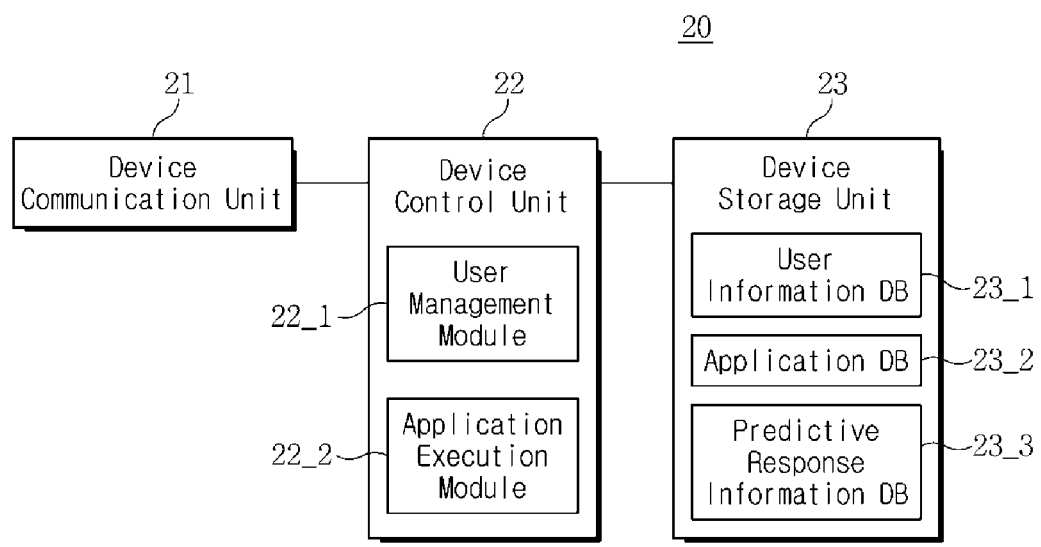
FIG. 3 is a block diagram showing a main configuration of a service device according to embodiments of the present invention.

FIG. 3 is a block diagram showing a main configuration of a service device according to embodiments of the present invention.

Referring to FIGS. 1 and 3, the service device 20 according to the first embodiment of the present invention may include a device communication unit 21, a device control unit 22, and a device storage unit 23.

First, the device communication unit 21 transmits and receives related information to and from a number of client terminals 10 over the communication network 30. In particular, the device communication unit 21 receives execution request information for a specific application from any one of the client terminals 10 and transmits result information obtained by executing the application to the client terminal 10. In addition, the device communication unit 21 receives input information and predictive response information from the client terminal 10, and transmits the predictive response information or real response information corresponding thereto to the client terminal 10.

The device control unit 22 controls an overall operation of the service device 20 of the present invention. In particular, when the execution request information for the specific application is received from any one of the client terminals 10, the device control unit 22 of the present invention transmits result information based on the application execution result to the client terminal 10 in real time.

In this case, the device control unit 22 encodes screen data based on the application execution result frame by frame in real time, and delivers the encoded data to the client terminal 10 through the device communication unit 21.

In addition, preferably, the device control unit 22 may receive user identification information from the client terminal 10 and perform user authentication on the basis of the user identification information. Thus, the device control unit 22 checks whether the client terminal 10 that has transmitted the execution request information for the application is a client terminal 10 of a user who has subscribed to a service provided by the service device 20 and then provides an application requested by the client terminal 10 only when the client terminal 10 is a client terminal of the subscribed user.

Here, an application that may be used by the client terminal 10 may include various types of applications. For example, a game-related application such as a 2D game and a 3D game, a document editing application such as a word processor, and the like may be used as the various types of applications.

The device control unit 22 performs user authentication on the client terminal 10 first and executes an application requested by the client terminal 10 when the authentication is successful. For example, the device control unit 22 executes a 3D role playing game application, encodes a screen frame being result information thereof in real time, and transmits the encoded screen frame to the client terminal 10.

Subsequently, when the input information and predictive response information are received from the client terminal 10 while the result information obtained by the execution is transmitted to the client terminal 10 in real time, the device control unit 22 searches the device storage unit 23 to be described below for the previously stored predictive response information corresponding to the input information.

Then, when the predictive response information previously stored in the device storage unit 23 corresponding to the input information exists, the device control unit 22 compares the predictive response information received from the client terminal 10 with the previously stored predictive response information and transmits the predictive response information previously stored in the device storage unit 23 to the client terminal 10 when the predictive response information is different, as a result of the comparison.

Subsequently, after transmitting the previously stored predictive response information to the client terminal 10 corresponding to the input information, the device control unit 22 generates real response information for the input information. Here, the device control unit 22 may store the predictive response information corresponding to the input information based on user information and may transmit the predictive response information to the client terminal 10 on the basis of user information of the client terminal 10.

To provide a description through an example of a document editing application, when the first client terminal and the second client terminal are using the document editing application that is executed by the service device 20, input information input by the first client terminal may be different from input information input by the second client terminal.

For example, if a user of the first client terminal is a user having a great interest in brain structure and a user of the second client terminal is a user having a great interest in communication technologies, the input information transmitted from the first client terminal may be 'brain,' 'ischemic,' 'stroke,' 'intracerebral,' 'hemorrhage' and the like. The input information transmitted from the second client terminal may be 'broadband,' 'internet,' 'session,' 'intranet,' 'http' and the like.

As such, in a case of analyzing the predictive response information corresponding to the input information received from the client terminal 10 on the basis of user information, when the input information received from the client terminal 10 is 'intra' and the predictive response information is 'intractable,' first, the device control unit 22 checks user information of the client terminal 10.

When it is checked that the user of the client terminal 10 is a user who inputs 'intranet' more frequently than 'intracerebral,' the device control unit 22 selects 'intranet' as the predictive response information for the input information.

Subsequently, the device control unit 22 compares 'intractable' that is the predictive response information received from the client terminal 10 with 'intranet' that is the selected predictive response information and transmits 'intranet' that is the predictive response information selected by the device control unit 22 to the client terminal 10 because 'intractable' and 'intranet' are different.

Upon receiving this, the client terminal 10 may select or immediately output 'intranet.'

In this case, when the predictive response information for the previously stored input information corresponding to the user information does not exist, the device control unit 22 may check and transmit general basic predictive response information to the client terminal 10.

Subsequently, after transmitting the predictive response information to the client terminal 10, the device control unit 22 may perform control to process an operation corresponding to the input information received from the client terminal 10, compare the real response information with the predictive response information previously transmitted to the client terminal 10, and transmit the real response information to the client terminal 10 when the real response information and the predictive response information are different.

To perform such an operation, the device control unit 22 of the present invention may include a user management module 22_1 that performs user authentication of the client terminal 10 when application execution request information is received from the client terminal 10, calculates statistics of input information received from the client terminal 10, and controls, for example, analysis of the calculated statistics and an application execution module 22_2 that controls application execution according to a request of the client terminal 10, and when input information is received from the client terminal 10 while the application is executed, transmits predictive response information corresponding to the input information to the client terminal 10, generates real response information to compare the real response information with the predictive response information, and when the real response information and the predictive response information are different, controls, for example, transmission of the real response information.

As described above, the device storage unit 23 stores a variety of information for providing an immediate result for a user input of the present invention. Accordingly, the device storage unit 23 may include a user information database (DB) 23_1 that stores user information for performing user authentication, an application DB 23_2 that stores and manages one or more applications, and a predictive response information DB 23_3 that stores predictive response information corresponding to input information.

Figure 4:
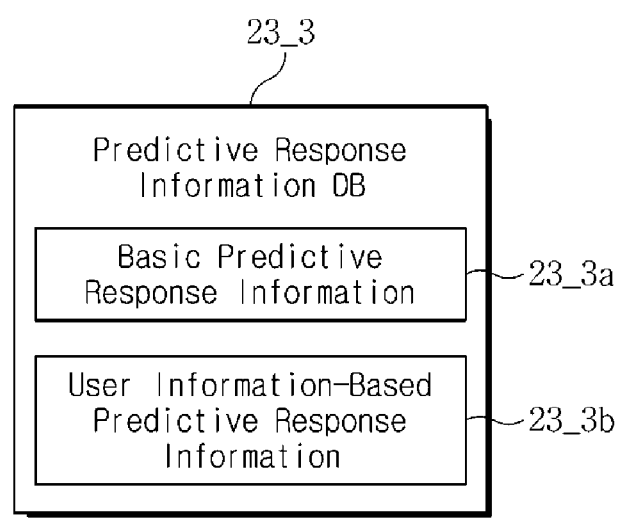
FIG. 4 is a block diagram showing a detailed structure of a predictive response information database (DB) according to embodiments of the present invention.

Here, as described above, the predictive response information DB 23_3 contains predictive response information that may have been calculated based on statistics of the real response information that is an actual processing result for past input information. In this case, as described in FIG. 4, basic predictive response information 23_3a calculated based on the statistics of the real response information for the input information and user information-based predictive response information 23_3b may be stored regardless of users.

The main configuration and the operation method of the service device 20 according to a first embodiment of the present invention have been described above.

The service device 20 according to a first embodiment of the present invention has been described as operating in a cloud scheme, but may be easily applied to a general server-based computing scheme.

A method for providing an immediate result for a user input according to a first embodiment of the present invention will be described below.

Figure 5:
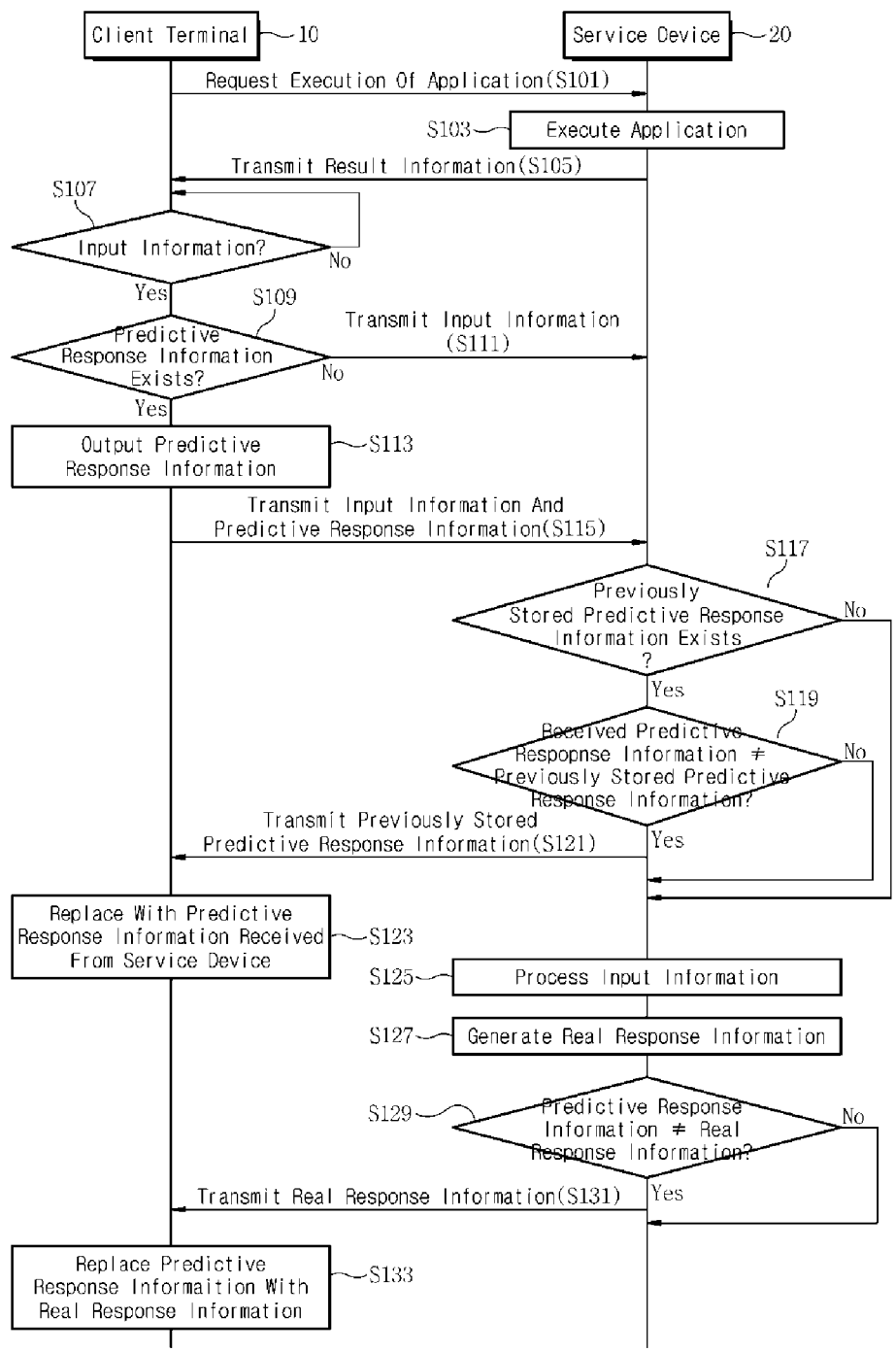
FIG. 5 is a data flowchart showing a method for providing an immediate result for a user input according to a first embodiment of the present invention.

FIG. 5 is a data flowchart showing a method for providing an immediate result for a user input according to a first embodiment of the present invention.

Referring to FIG. 5, first, the client terminal 10 requests the service device 20 that provides a cloud-based application service to execute a specific application (S101). When the request is received, the service device 20 executes a corresponding application according to the request of the client terminal 10 (S103) and transmits a result of the execution to the client terminal 10 in real time (S105).

In this case, the client terminal 10 determines whether the input information is input from the user (S107) and checks whether previously stored predictive response information corresponding to the input information exists when the input information is input by the user (S109).

When it is checked that the previously stored predictive response information does not exist, the client terminal 10 transmits the input information to the service device 20 (S111), and when the previously stored predictive response information exists, the client terminal 10 outputs the predictive response information (S113).

Subsequently, the client terminal 10 transmits the input information and the predictive response information to the service device 20 (S115), and the service device 20 checks whether the previously stored predictive response information corresponding to the input information exists (S117).

When it is checked that the previously stored predictive response information exists, the service device 20 compares the predictive response information received from the client terminal 10 with the previously stored predictive response information (S119) and transmits the previously stored predictive response information to the client terminal 10 when the predictive response information is different (S121).

Subsequently, the client terminal 10 outputs the predictive response information received from the service device 20 in replacement of the previously output predictive response information (S123).

Subsequently, the service device 20 actually processes the input information received from the client terminal 10 (S125) to generate real response information (S127). Next, the service device 20 compares the real response information with the predictive response information previously transmitted to the client terminal 10 (S129) and transmits the real response information to the client terminal 10 when the predictive response information and the real response information are different (S131).

When the real response information is received, the client terminal 10 may display the real response information in replacement of the predictive response information (S133). Although not shown in the drawings, the client terminal 10 may generate and store predictive response information corresponding to the response information on the basis of the real response information. In this case, existing predictive response information may be deleted.

Here, upon generating the predictive response information on the basis of the real response information, the client terminal 10 may delete unnecessary information and then generate the predictive response information using only necessary information. For example, when the input information input from the user is 'click while a mouse pointer is positioned on [Insert] menu' on the document editing application, and the real response information thereof is information on a screen in a state in which a lower menu is dropped down, the client terminal 10 may delete information on a document editing application screen that is a background and then store as the predictive response information only a state in which a lower menu is dropped down.

Since the above-described process may be performed in real time, the user may use an application provided by the service device 20 without particular perception and receive an immediate result for a user input. In addition, in step S117, the service device 20 may perform user authentication on the client terminal 10 and check whether the previously stored predictive response information corresponding to the user information exists.

An operation method of the above-described service device 20 will be described in detail below.

Figure 6A:
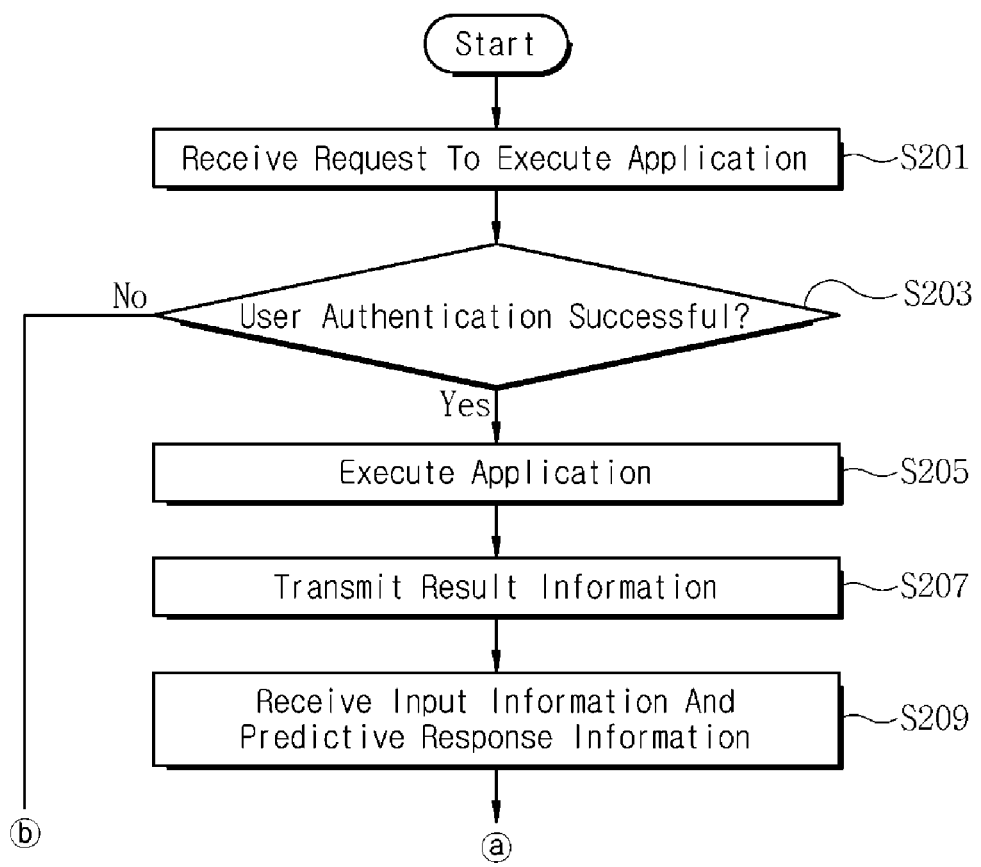
FIGS. 6a and 6b are a flowchart showing a detailed operation method by a service device according to a first embodiment of the present invention.
Figure 6B:
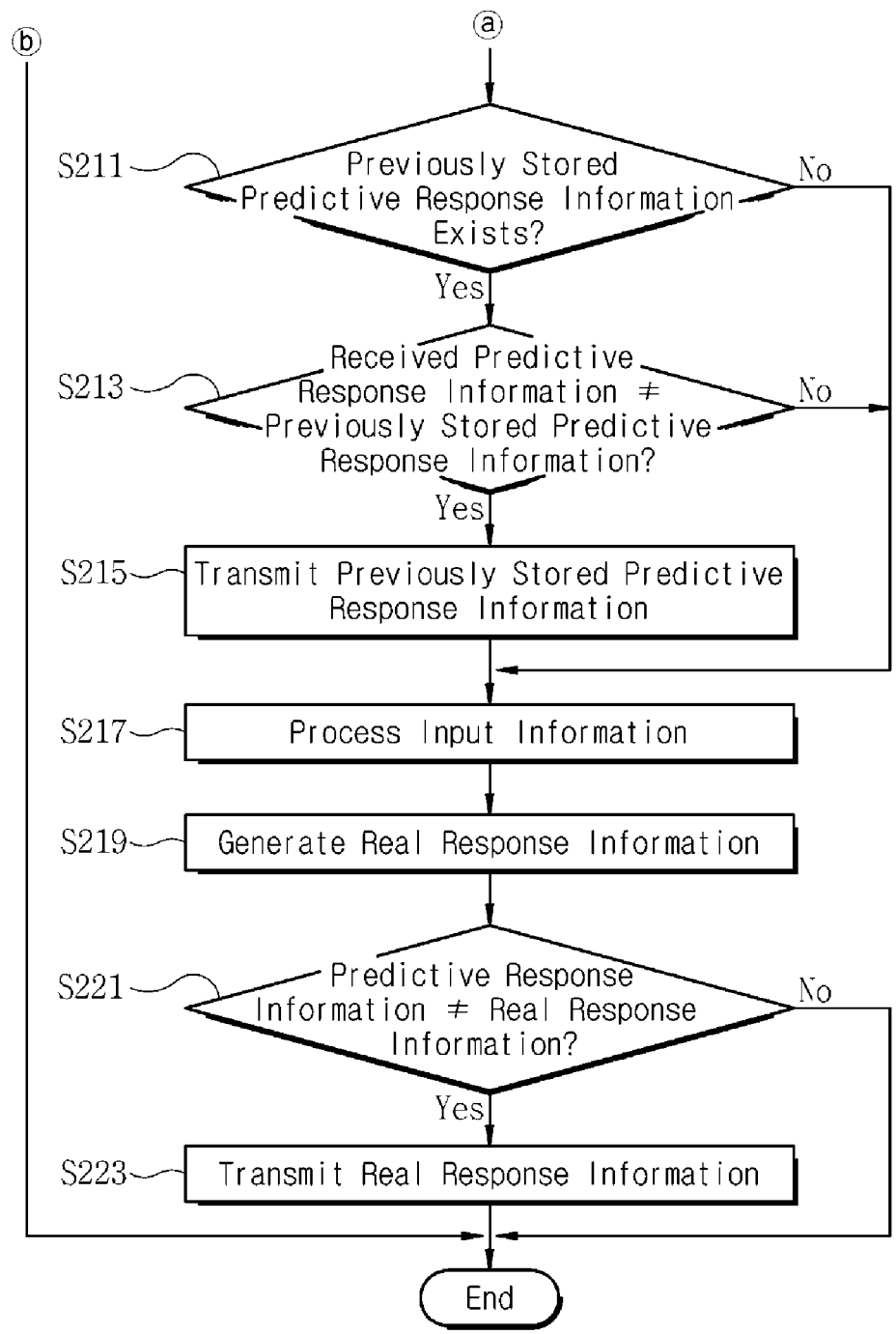

FIGS. 6a and 6b are a flowchart showing a detailed operation method by a service device according to a first embodiment of the present invention.

Referring to FIGS. 1, 6a and 6b, the service device 20 receives a request to execute a specific application from the client terminal 10 (S201) and performs user authentication based on the user information of the client terminal 10 that is received together with the request (S203).

If the user authentication is successful, the service device 20 executes the application (S205) and transmits result information obtained by the execution to the client terminal 10 in real time (S207). Subsequently, when input information and predictive response information are received from the client terminal (S209), the service device 20 determines whether previously stored predictive response information exists (S211) and compares the received predictive response information with the previously stored predictive response information when the previously stored predictive response information exists (S213).

In step S211, the service device 20 may determine whether the previously stored predictive response information corresponding to the user information exists and also determine whether predictive response information that is basically generated exists when the previously stored predictive response information corresponding to the user information does not exist.

In addition, before determining whether the previously stored predictive response information exists, the service device 20 may determine whether the input information is input information requiring an immediate output and then determine whether the previously stored predictive response information exists only when the input information is input information requiring an immediate output.

After step S213, the service device 20 actually processes an operation for the input information to generate real response information (S219) and compares the generated real response information with the predictive response information that was previously transmitted to the client terminal 10 (S221).

As a result of the comparison, when the previously transmitted predictive response information and the real response information are different, the service device 20 transmits the real response information to the client terminal 10 (S223).

As such, the present invention may provide an immediate result for a user input by first transmitting the previously stored predictive response information to the client terminal 10 corresponding to the input information received from the client terminal 10.

In addition, the present invention may also enhance reliability upon transmitting the predictive response information by transmitting the predictive response information to the client terminal 10 only when the input information requires an immediate output for the user input, processing the input information after transmitting the predictive response information, and when the real response information and the previously transmitted predictive response information are different, transmitting the real response information.

The method of providing an immediate result for a user input according to a first embodiment of the present invention has been described above.

Next, a configuration and method for providing an immediate result for a user input according to a second embodiment of the present invention will be described in detail with reference to the accompanying drawings.

First a main configuration and an operation method of the client terminal 10 according to a second embodiment of the present invention will be described with reference to FIG. 2.

Referring to FIG. 2, the client terminal 10 according to a second embodiment of the present invention may include a communication unit 11, an input unit 12, a control unit 13, a storage unit 14, and a display unit 15.

For detailed description of each element, first, the communication unit 11 transmits and receives a variety of related information with the service device 20 over the communication network 30. In particular, the communication unit 11 of the present invention may transmit execution request information for a specific application to the service device 20 according to a user's request and receive result information according to the application execution result from the service device 20.

In this case, the communication unit 11 of the present invention may receive screen data in the form of real-time streaming according to a result of executing an application executed by the service device 20. In addition, the communication unit 11 of the present invention may transmit the input information input from the user to the service device 20, receive the predictive response information from the service device 20, and then receive the real response information from the service device 20.

The input unit 12 receives a variety of information such as number and character information input from the user and delivers, to the control unit 13, a signal that is input in relation to setting of various functions and controlling of functions of the client terminal 10. In particular, the input unit 12 of the present invention serves to receive execution request information for a specific application among a number of applications and supports the user input for performing a variety of functions and operations that are generated while the application is executed.

In particular, the input information input through the input unit 12 while an application requested by the user is executed may be transmitted to the service device 20 through the communication unit 11 under control of the control unit 13.

The input unit 12 may include at least one of a keypad and a touchpad, which generates an input signal according to a touch or manipulation of a user. In this case, the input unit 12 may be configured as a touch panel (or touch screen) on the display unit 15 to be described below and perform an input function and also a display function. In addition, the input unit 12 may include one or more of a key input means such as a keyboard or keypad, a touch input means such as a touch sensor or touch pad, and a gesture input means or voice input means including one or more of a gyro sensor, a geomagnetic sensor, an acceleration sensor, a proximity sensor, and a camera. Furthermore, the input unit 12 may include all types of input means that are currently developed or will be developed in the future.

The control unit 13 performs overall control of the client terminal 10, and for example, controls a flow of signals for supplying power to and performing a function of each element that constitutes the client terminal 10. In this case, the control unit 13 may be a processing device, for example, a central processing unit (CPU) for driving an operating system (OS) and each element.

In particular, the control unit 13 according to an embodiment of the present invention supports an overall procedure that includes: requesting the service device 20 for executing a number of applications to execute a specific application according to a user's request, receiving a result of executing the application that is received from the service device 20 in real time, and outputting the received result. To this end, the control unit 13 of the present invention may include a stream data decoder 13_1 such as a H.264 decoder. Here, the stream data decoder 13_1 may support receiving screen data based on the application execution result provided by the service device 20 in real time, decoding the received screen data in real time, and outputting the decoded screen data through the display unit 15.

In addition, the control unit 13 may perform control to display the predictive response information through the display unit 15 when the predictive response information is received from the service device 20 after the input information input from the user is transmitted to the service device 20.

In addition, when the real response information is received from the service device 20 after the control unit 13 displays the predictive response information received from the service device 20, the control unit 13 may output the real response information in replacement of the predictive response information. When the real response information is received after the client terminal 10 outputs the predictive response information, the above-described process of outputting the real response information instead is performed in real time.

The storage unit 14 may temporarily store an application program necessary for functional operations according to an embodiment of the present invention and various data that is generated during execution of the application program. In particular, when application-related information that is requested by the user is received from the service device 20, the storage unit 14 of the present invention may serve to temporarily store the application-related information. When execution of the application is stopped and related information is not received from the service device 20, the temporarily stored data may be deleted. In addition, the storage unit 14 may temporarily store the predictive response information and the real response information that are received corresponding to the input information from the service device 20. The above-description is merely illustrative, and related data may be permanently stored in the storage unit 14.

The storage unit 14 may largely include a program area and a data area. The program area may store related information for driving the client terminal 10, such as an operating system (OS) that boots the client terminal 10, and the data area is an area for storing data generated according to the use of the client terminal 10 in which information received from the service device 20 may be temporarily stored as described above. The storage unit 14 may include a storage medium such as a flash memory, a hard disk, a multimedia card micro type memory (for example, an SD or XD memory), a random access memory (RAM), and a read only memory (ROM).

The display unit 15 displays information on a series of operation states and operation results that are generated while the client terminal 10 performs functions. In particular, the display unit 15 of the present invention may receive and display a processing result from an application provided by the service device 20 and may display the received predictive response information and real response information corresponding to input information input by the user through the input unit 12.

The display unit 15 may include a liquid crystal display (LCD), a thin film transistor LCD (TFT-LCD), an organic light emitting diode (OLED), a light emitting diode (LED), an active matrix organic LED (AMOLED), a flexible display, and a three-dimensional display.

As such, the main elements of the client terminal 10 have been described with reference to FIG. 2. However, not all of these elements shown in FIG. 2 are essential. The client terminal 10 may be implemented by more or fewer elements than those shown in the drawings.

That is, the client terminal 10 of the present invention is a device that may request the service device 20 to execute a specific application by various elements, output information received from the service device 20, transmit the input information input from the user to the service device 20, and then receive and output any one of the predictive response information and the real response information corresponding thereto.

The client terminal 10 according to an embodiment of the present invention may be implemented in various forms. For example, the client terminal according to an embodiment of the present invention may be a stationary terminal such as a smart TV, a desktop computer, and the like as well as a mobile terminal such as a smart phone, a tablet PC, a personal digital assistant (PDA), a portable multimedia player (PMP), and an MP3 player.

A main configuration and an operation method of the service device 20 according to a second embodiment of the present invention will be described below with reference to FIG. 3.

Referring to FIGS. 1 and 3, the service device 20 according to the second embodiment of the present invention may include a device communication unit 21, a device control unit 22, and a device storage unit 23.

First, the device communication unit 21 transmits and receives related information to and from a number of client terminals 10 over the communication network 30. In particular, the device communication unit 21 receives execution request information for a specific application from any one of the client terminals 10 and transmits result information obtained by executing the application to the client terminal 10. In addition, the device communication unit 21 receives input information from the client terminal 10 and transmits the predictive response information or real response information corresponding thereto to the client terminal 10.

The device control unit 22 controls an overall operation of the service device 20 of the present invention. In particular, when the execution request information for the specific application is received from any one of the client terminals 10, the device control unit 22 of the present invention transmits result information based on the application execution result to the client terminal 10.

In this case, the device control unit 22 encodes screen data based on the application execution result frame by frame in real time, and delivers the encoded data to the client terminal 10 through the device communication unit 21.

In addition, preferably, the device control unit 22 may receive user identification information from the client terminal 10 and perform user authentication on the basis of the user identification information. Thus, the device control unit 22 checks whether the client terminal 10 that has transmitted the execution request information for the application is a client terminal 10 of a user who has subscribed to a service provided by the service device 20 and then provides an application requested by the client terminal 10 only when the client terminal 10 is a client terminal of the subscribed user.

Here, an application that may be used by the client terminal 10 may include various types of applications. For example, a game-related application such as a 2D game and a 3D game, a document editing application such as a word processor, and the like may be used as the various types of applications.

As such, the device control unit 22 performs user authentication on the client terminal 10 first and executes an application requested by the client terminal 10 when the authentication is successful. For example, the device control unit 22 may execute a 3D role playing game application, encode a screen frame being result information thereof in real time, and transmit the encoded screen frame to the client terminal 10.

Subsequently, when the input information is received from the client terminal 10 while the result information obtained by the execution is transmitted to the client terminal 10 in real time, the device control unit 22 searches the device storage unit 23 to be described below for the previously stored predictive response information corresponding to the input information.

In this case, preferably, the device control unit 22 may search for the previously stored predictive response information after checking whether the input information received from the client terminal 10 is input information requiring provision of an immediate result.

This is intended to selectively transmit the predictive response information because there may be a case in which real response information should be provided accurately, but slowly, rather than a case in which the previously predictive response information corresponding to the input information received from the client terminal 10 is provided immediately.

For example, it is assumed that the service device 20 services a 3D role playing game application to the client terminal 10. In a situation in which several characters collect a number of items at the same time, although input information that is received from the client terminal 10 is a collection command for item A, but the service device 20 transmits a processing result for collection of item B to the client terminal 10, the user will not feel inconvenience. Rather, the user will need an immediate processing result when a number of characters compete with each other.

However, there may be a situation in which the user desires to provide an accurate result rather than the immediate processing result. For example, if the input information of the user is a storage command for storing a current state, but a command other than the storage command is performed, the user may feel inconvenience.

As such, the device control unit 22 of the service device 20 may determine whether the input information received from the client terminal 10 is input information requiring an immediate output and then provide the previously stored predictive response information to the client terminal 10 corresponding to the input information only when the immediate output is required.

Subsequently, the device control unit 22 transmits the previously stored predictive response information to the client terminal 10 corresponding to the input information and then generates real response information for the input information. Here, the device control unit 22 may store the predictive response information corresponding to the input information based on user information and may transmit the predictive response information to the client terminal 10 on the basis of user information of the client terminal 10.

To provide a description through an example of a document editing application, when the first client terminal and the second client terminal are using the document editing application that is executed by the service device 20, input information input by the first client terminal may be different from input information input by the second client terminal.

For example, if a user of the first client terminal is a user having a great interest in brain structure and a user of the second client terminal is a user having a great interest in communication technologies, the input information transmitted from the first client terminal may be 'brain,' 'ischemic,' 'stroke,' 'intracerebral,' 'hemorrhage' and the like. The input information transmitted from the second client terminal may be 'broadband,' 'internet,' 'session,' 'intranet,' 'http' and the like.

As such, in a case of analyzing the predictive response information corresponding to the input information received from the client terminal 10 on the basis of user information, when the input information received from the client terminal 10 is 'intra,' the device control unit 22 checks user information of the client terminal 10.

When it is checked that the user of the client terminal 10 is a user who inputs 'intranet' more frequently than 'intracerebral,' the device control unit 22 transmits 'intranet' to the client terminal 10 as the predictive response information for the input information. When 'intranet' is received, the client terminal 10 may immediately output 'intranet' on the document editing application.

In this case, when the predictive response information for the previously stored input information corresponding to the user information does not exist, the device control unit 22 may check and transmit general basic predictive response information to the client terminal 10.

In addition, the control unit 22 of the present invention may perform control to generate predictive response information on the basis of real response information that is actually processed corresponding to the response information and then store the generated predictive response information in the storage unit 23.

In this case, the control unit 22 may generate the predictive response information corresponding to the response information by user information and application type.

For example, if a user inputs a character 'T' having font information of Batangche and 12 points through a document editing application, the device control unit 22 may store the processing result (a screen in which a character 'T' of Batangche and 12 points is input) corresponding to 'T' as the predictive response information.

In addition, when the user clicks [Insert] menu through the document editing application, various lower menus such as [Divide Page], [Insert Picture], [Insert Figure], and the like may be displayed. The device control unit 22 may store, as the predictive response information, the processing result, that is, information on a screen in a state in which a lower menu is dropped down corresponding to the input information of 'click while a mouse pointer is positioned on [Insert] menu.' In addition, when a user A repeatedly inputs a word 'session' through the document editing application, the control unit 22 may perform control to generate 'session' as the predictive response information for input information 'se' and store the 'session' in the device storage unit 23.

In addition, when the user inputs 'A' while using a game application A, if real response information corresponding to the 'A' is an attack behavior of a player, the device control unit 22 may store 'attack in front of a player' as predictive response information for the input information 'A' corresponding to identification information for the game application A, predict movement for the attack behavior on the basis of movement of a player in the last frame of the game application A transmitted to the client terminal 10, and then transmit the movement to the client terminal 10.

Thus, the user of the client terminal 10 may rapidly receive a processing result corresponding to his/her input information and check the processing result.

In addition, after transmitting the predictive response information to the client terminal 10, the device control unit 22 performs control to process an operation corresponding to the input information received from the client terminal 10, compares the real response information with the predictive response information previously transmitted to the client terminal 10, and transmits the real response information to the client terminal 10 when the real response information and the predictive response information are different.

As such, the service device 20 according to a second embodiment of the present invention may provide an immediate result for a user input by first transmitting the previously stored predictive response information to the client terminal 10 corresponding to the input information received from the client terminal 10.

Moreover, the present invention may also enhance reliability upon transmitting the predictive response information by transmitting the predictive response information to the client terminal 10 only when the input information requires an immediate output for the user input, processing the input information after transmitting the predictive response information, and when the real response information and the previously transmitted predictive response information are different, transmitting the real response information.

To perform such an operation, the device control unit 22 according to a second embodiment of the present invention may include a user management module 22_1 that performs user authentication of the client terminal 10 when application execution request information is received from the client terminal 10, calculates statistics of input information received from the client terminal 10, and controls, for example, analysis of the calculated statistics and an application execution module 22_2 that controls application execution according to a request of the client terminal 10, and when input information is received from the client terminal 10 while the application is executed, transmits predictive response information corresponding to the input information to the client terminal 10, generates real response information to compare the real response information with the predictive response information, and when the real response information and the predictive response information are different, controls, for example, transmission of the real response information.

As described above, the device storage unit 23 stores a variety of information for providing an immediate result for a user input of the present invention. Accordingly, the device storage unit 23 may include a user information database (DB) 23_1 that stores user information for performing user authentication, an application DB 23_2 that stores and manages one or more applications, and a predictive response information DB 23_3 that stores predictive response information corresponding to input information.

Here, as described above, the predictive response information DB 23_3 contains predictive response information that may have been calculated based on statistics of the real response information that is an actual processing result for past input information. In this case, as described in FIG. 4, basic predictive response information 23_3a calculated based on the statistics of the real response information for the input information and user information-based predictive response information 23_3b may be stored regardless of users.

The main configuration and the operation method of the service device 20 according to a second embodiment of the present invention have been described above.

The service device 20 according to a second embodiment of the present invention has been described as operating in a cloud scheme, but may be easily applied to a general server-based computing scheme.

A method for providing an immediate result for a user input according to a second embodiment of the present invention will be described below.

Figure 7:
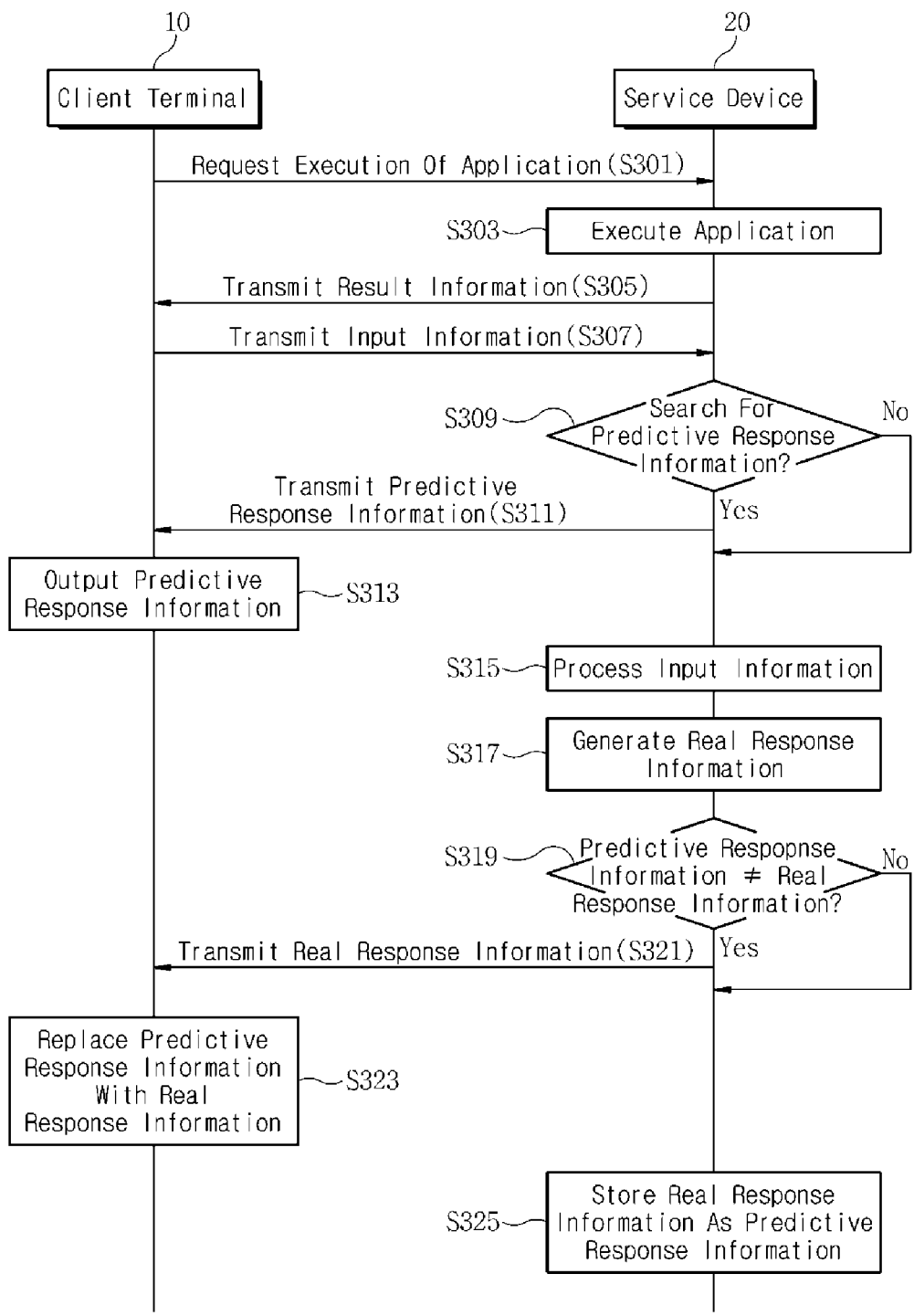
FIG. 7 is a data flowchart showing a method for providing an immediate result for a user input according to a second embodiment of the present invention.

FIG. 7 is a data flowchart showing a method for providing an immediate result for a user input according to a second embodiment of the present invention.

Referring to FIG. 7, first, the client terminal 10 requests the service device 20 that provides a cloud-based application service to execute a specific application (S301). When the request is received, the service device 20 executes a corresponding application according to the request of the client terminal 10 (S303) and transmits a result of the execution to the client terminal 10 in real time (S305).

In this case, when the client terminal 10 transmits specific input information for using an application to the service device 20 (S307), the service device 20 searches for the previously stored predictive response information corresponding to the input information (S309).

As a result of the search, when the previously stored predictive response information exists, the service device 20 transmits the predictive response information to the client terminal 10 (S311) and the client terminal 10 outputs the predictive response information (S313).

Subsequently, the service device 20 actually processes the input information received from the client terminal 10 (S315) to generate real response information (S317). Next, the service device 20 compares the real response information with the predictive response information previously transmitted to the client terminal 10 (S319) and transmits the real response information to the client terminal 10 when the predictive response information and the real response information are different (S321).

When the real response information is received, the client terminal 10 may display the real response information in replacement of the predictive response information (S323). The service device 20 may store the real response information transmitted to the client terminal 10 corresponding to the user information and then generate and store the predictive response information based on the real response information (S325).

Here, upon generating the predictive response information on the basis of the real response information, the service device 20 may delete unnecessary information and then generate the predictive response information using only necessary information. For example, when the input information received from the client terminal 10 is 'click while a mouse pointer is positioned on [Insert] menu' on the document editing application, and the real response information thereof is information on a screen in a state in which a lower menu is dropped down, the service device 20 may delete information on a document editing application screen that is a background and then store as the predictive response information only a state in which a lower menu is dropped down.

Since the above-described process may be performed in real time, the user may use an application provided by the service device 20 without particular perception and receive an immediate result for a user input.

An operation method of the above-described service device 20 will be described in detail below.

Figure 8A:
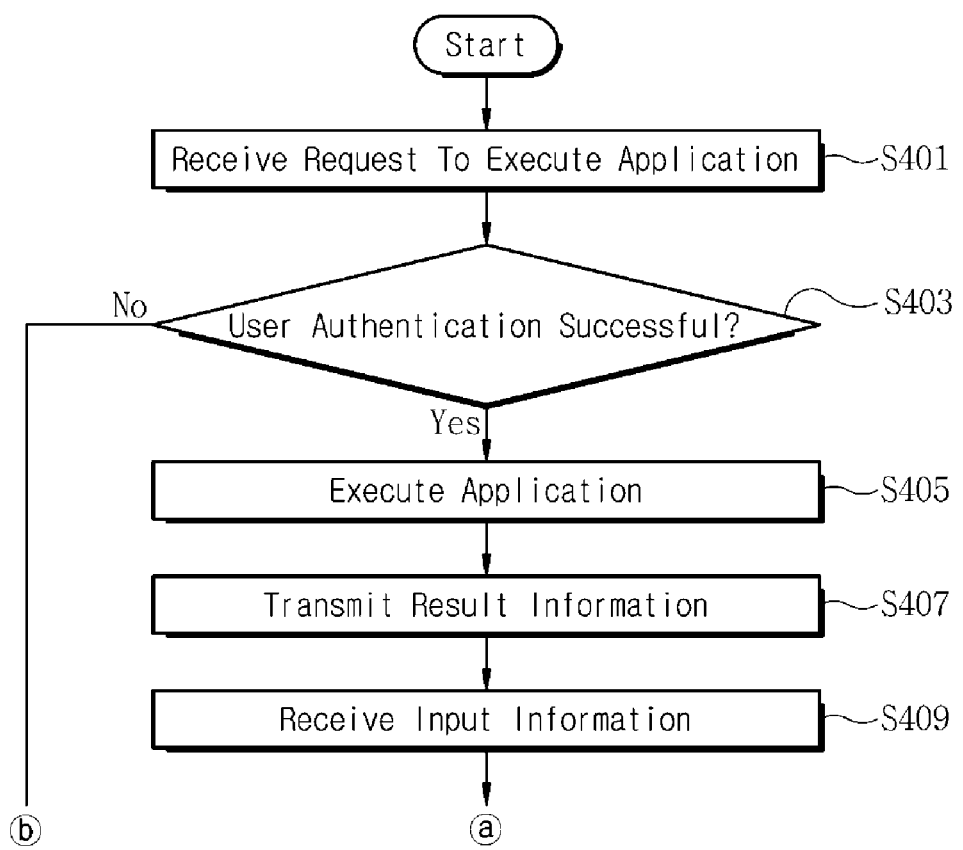
FIGS. 8a and 8b are a flowchart showing a detailed operation method by a service device according to a second embodiment of the present invention.
Figure 8B:
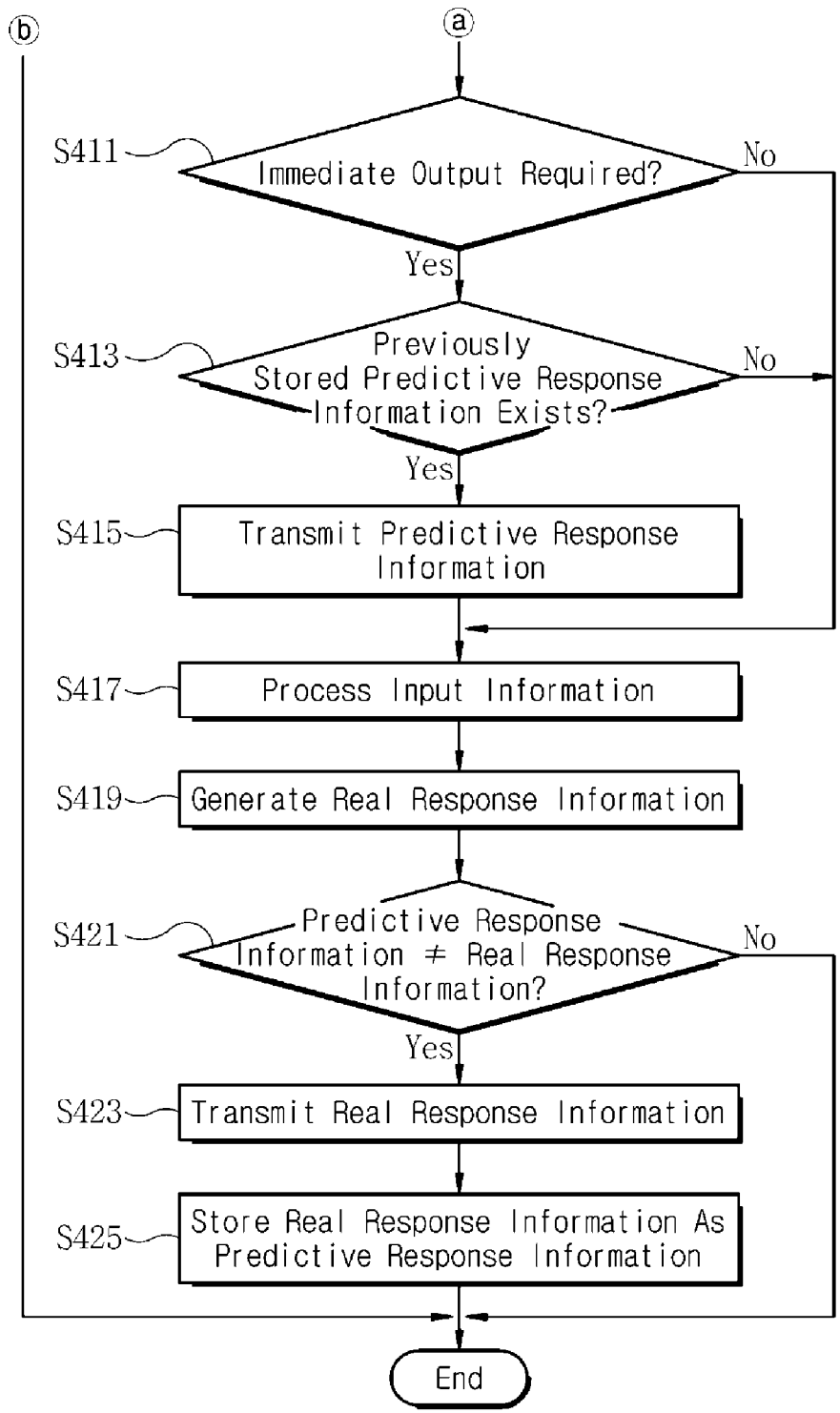

FIGS. 8a and 8b are a flowchart showing a detailed operation method by a service device according to a second embodiment of the present invention.

Referring to FIGS. 1, 8a and 8b, when the service device 20 receives a request to execute a specific application from the client terminal 10 (S401), the service device 20 performs user authentication based on the user information of the client terminal 10 that is received together with the request (S403).

If the user authentication is successful, the service device 20 executes the application (S405) and transmits result information obtained by the execution to the client terminal 10 in real time (S407). Subsequently, when input information is received from the client terminal (S409), the service device 20 determines whether the input information is input information requiring an immediate output (S411).

When the input information is input information requiring an immediate output, the service device 20 determines whether the previously stored predictive response information corresponding to the input information exists in order to transmit the predictive response information for the input information to the client terminal 10 (S413).

As a result of the determination, when the previously stored predictive response information exists, first, the service device 20 transmits the predictive response information to the client terminal 10 (S415). For example, when the input information received from the client terminal 10 is 'click while a mouse pointer is positioned on [Insert] menu' while a processing result obtained by executing the document editing application is provided to the client terminal 10, the service device 20 transmits the predictive response information corresponding to the input information, that is, information on a screen in a state in which a lower menu is dropped down to the client terminal 10.

As another example, if the input information received from the client terminal 10 is 'se' while a processing result obtained by executing the document editing application is provided to the client terminal 10, the service device 20 transmits previously stored predictive response information for 'se,' that is, 'session' to the client terminal 10 corresponding to user information of the client terminal 10.

After transmitting the predictive response information to the client terminal 10, the service device 20 actually processes an operation for the input information to generate real response information (S419) and compares the generated real response information with the predictive response information that was previously transmitted to the client terminal 10 (S421).

As a result of the comparison, when the previously transmitted predictive response information and the real response information are different, the service device 20 transmits the real response information to the client terminal 10 (S423).

Subsequently, the service device 20 generates predictive response information on the basis of the real response information provided to the client terminal 10 and stores the generated predictive response information (S425).

As such, the present invention may provide an immediate result for a user input by first transmitting the previously stored predictive response information to the client terminal 10 corresponding to the input information received from the client terminal 10.

In addition, the present invention may also enhance reliability upon transmitting the predictive response information by transmitting the predictive response information to the client terminal 10 only when the input information requires an immediate output for the user input, processing the input information after transmitting the predictive response information, and when the real response information and the previously transmitted predictive response information are different, transmitting the real response information.

The method of providing an immediate result for a user input according to a second embodiment of the present invention has been described above.

The method for providing an immediate result for a user input according to an embodiment of the present invention can also be implemented as computer-readable codes on a computer-readable recording medium. The computer-readable recording medium may include a program command, a data file, a data structure, and the like, which are used alone or in combination thereof, and includes all kinds of recording devices configured to store data that may be read by a computer system. Examples of the computer-readable recording medium include magnetic media such as a hard disk, a floppy disk, and a magnetic tape, optical media such as a compact disk read only memory (CD-ROM) and a digital video disk (DVD), magneto-optical media such as a floptical disk, and a hardware device specially configured to store and perform the program instruction, such as a read only memory (ROM), a random access memory (RAM), a flash memory, etc.

The computer-readable recording medium may be distributed to computer systems connected over a network. Thus the computer-readable code may be stored and executed in a distributed fashion. Also, functional programs, codes, and code segments for accomplishing the present invention can be easily construed by programmers skilled in the art to which the present invention pertains.

While the invention has been shown and described with reference to preferred embodiments thereof, it will be understood by those skilled in the art that such description is for illustrative purposes only and various changes and modifications may be made without departing from the spirit and scope of the invention as defined by the appended claims. Therefore, all such changes and modifications, and the equivalents thereof, will be considered to be within the spirit and scope of the invention.

While the present invention has been described with reference to exemplary embodiments, it will be apparent to those skilled in the art that various changes and modifications may be made without departing from the spirit and scope of the present invention. For example, the predictive response information for the input information of the client terminal may be generated based on various prediction techniques. The predictive response information may be generated based on statistics of past real response information or through a motion estimation scheme.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. The computer program does not necessarily correspond to a file of a file system. The program may be stored in a single file provided to a requested program, in interoperating multiple files (for example, files each storing some of one or more modules, lower level programs, or codes) or in a part of a file containing other programs or data (for example, one or more scripts stored in a markup language document). The computer program may be located at a single site or over a plurality of sites in a distributed fashion and developed so as to be executed on multiple computers connected to one another through a communication network or on a single computer.

The specification includes details of a number of specific implements, but it should be understood that the details do not limit the present invention or what is claimable in the specification but rather describe features of the specific embodiment. Features described in the specification in the context of individual embodiments may be implemented as a combination in a single embodiment. In contrast, features described in the specification in the context of a single embodiment may be implemented in multiple embodiments individually or in an appropriate sub-combination. Furthermore, the features may operate in a certain combination and may be initially described as claimed in the combination, but one or more features may be excluded from the claimed combination in some cases, and the claimed combination may be changed into a sub-combination or a modification of a sub-combination.

Similarly, even though operations are described in a certain order on the drawings, it should not be understood that the operations be executed in the certain order or in a sequential order to obtain desired results, or that all of the operations be executed. In addition, it should not be understood that the separation of various system components in the above described embodiments is required in all embodiments, and it should be understood that the above described program components and systems may be incorporated into a single software product or may be packaged in multiple software products.

The present invention relates to a method for providing a processing result based on a user input, and more particularly, to a service providing method, and a system and apparatus therefore, which are capable of first outputting predictive response information that is previously stored in a client terminal before transmitting a specific input to a service device when the specific input is input by a user, thus rapidly providing an immediate result for a user input.

According to a service providing method, and a system and apparatus therefore that may provide an immediate result for a user input, when a specific input is received from a user, predictive response information based on the input may be first output, thus rapidly providing a processing result for the user input and thereby making a contribution to a broader use of cloud-based service.

Moreover, the present invention has industrial applicability in that it is obvious to have sufficient possibility of marketability and also actually be carried out.

In this specification, exemplary embodiments of the present invention have been classified into the first, second and third exemplary embodiments and described for conciseness. However, respective steps or functions of an exemplary embodiment may be combined with those of another exemplary embodiment to implement still another exemplary embodiment of the present invention.

What is claimed is:

1. A method for providing a screen virtualization-based cloud service executed by a processor of a service device, the method comprising:
   executing, at the service device, an application to generate a result screen;
   sending, by the service device, the result screen of the executed application to a client terminal;
   receiving, at the service device, user input information from the client terminal, wherein the user input information is received via a user input in the result screen displayed on the client terminal;
   receiving at the service device, from the client device terminal, predictive response information representing a predicted processing result of the client terminal based on the user input information, the client terminal determining the predictive response information by searching for and identifying information stored in the client device terminal matching the user input information, wherein the client terminal displays the predictive response information on a display of the client terminal;
   determining, at the service device, secondary predictive response information representing a predicted processing result of the client terminal based on the user input information, by searching for and identifying information stored in the service device matching the user input information;
   comparing, by the service device, the predictive response information received from the client terminal with the secondary predictive response information stored in the service device;
   before generating real response information, wherein the real response information is generated by processing the user input information using the application executing at the service device:
   responsive to determining that the predictive response information from the client terminal and the secondary predictive response information stored in the service device are identical:
      causing the client terminal to continue displaying the predictive response information;
   responsive to determining that the predictive response information from the client terminal and the secondary predictive response information stored in the service device are different:
      transmitting, by the service device, the secondary predictive response information to the client terminal, and
      causing the client terminal to replace the predictive response information being displayed at the client terminal with the secondary predictive response information received from the service device for display at the client terminal; and
   generating, by the service device, the real response information by processing the user input information received from the client terminal using the application executing at the service device;
   responsive to determining that the secondary predictive response information previously transmitted to the client terminal and the real response information are different:
      transmitting, by the service device, the real response information to the client terminal, and displaying the received real response information on the display of the client terminal.

2. The method of claim 1, further comprising:
   authenticating a user of the client terminal, wherein the secondary predictive response information is determined based on user identification information of the authenticated user.

3. The method of claim 1, wherein responsive to determining the predictive response information corresponding to the user input information is not stored in the client terminal:
sending, by the service device, the real response information without sending the secondary predictive response information to the client terminal.

4. The method of claim 1 further comprising, after transmitting the real response information to the client terminal:
   storing the real response information and the user input information in the client terminal as predictive response information corresponding to the user input information for subsequent search and identification.

5. A system for providing a processing result for user input information comprising a screen virtualization-based cloud service implemented by a service device executing an application, wherein the service device of the system comprises:
   a device storage unit configured to store secondary predictive response information representing a predicted processing result of a client terminal based on user input information, the user input information received from the client terminal, wherein the user input information is received via a user input in the result screen displayed on the client terminal; and
   a device control unit, implemented by a processor, configured to:
   receive, by the service device, the user input information and predictive response information from the client terminal, wherein the predictive response information received from the client terminal represents a predicted processing result of the client terminal based on the user input information, the client terminal determining the predictive response information by searching for and identifying information stored in the client terminal matching the user input information, wherein the client terminal displays the predictive response information on a display of the client terminal, selecting, by the service device, the secondary predictive response information from information stored in the device storage unit of the service device, by searching for and identifying information stored in the service device matching the user input information;

before generating real response information, wherein the real response information is generated by processing the user input information using the application executing at the service device:

comparing, by the service device, the predictive response information received from the client terminal and the secondary predictive response information stored in the device storage unit of the service device;

responsive to determining that the predictive response information received from the client terminal and the secondary predictive response information stored in the device storage unit of the service device are identical: causing the client terminal to continue displaying the predictive response information;

responsive to determining that the predictive response information the client terminal and the secondary predictive response information stored in the device storage unit of the service device are different:

transmitting, by the service device, the secondary predictive response information to the client terminal, and causing the client terminal to replace the predictive response information being displayed at the client terminal with the secondary predictive response information received from the service device for display at the client terminal, and generating, by the service device, the real response information by processing the user input information received from the client terminal using the application executing at the service device:

responsive to determining that the secondary predictive response information previously transmitted to the client terminal and the real response information are different:

transmitting, by the service device, the real response information to the client terminal, and displaying the received real response information on the display of the client terminal.

6. The service device of claim 5, wherein the device control unit of the service device is further configured to transmit real response information corresponding to the user input information to the client terminal without sending the secondary predictive response information to the client terminal when the secondary predictive response information corresponding to the user input information is not stored in the device storage unit of the service device.

* * * * *